United States Patent
Goettfert (10) Patent No.: US 10,469,270 B2
(45) Date of Patent: Nov. 5, 2019

(54) DATA PROCESSING DEVICES AND METHODS FOR RECONSTRUCTING A PUF VALUE

(71) Applicant: Infineon Technologies AG, Neubiberg (DE)

(72) Inventor: Rainer Goettfert, Putzbrunn (DE)

(73) Assignee: Infineon Technologies AG, Neubiberg (DE)

( * ) Notice: Subject to any disclaimer, the term of this patent is extended or adjusted under 35 U.S.C. 154(b) by 203 days.

(21) Appl. No.: 15/429,296

(22) Filed: Feb. 10, 2017

(65) Prior Publication Data

US 2017/0237573 A1    Aug. 17, 2017

(30) Foreign Application Priority Data

Feb. 15, 2016  (DE) ........................ 10 2016 102 590

(51) Int. Cl.
*H04L 9/32* (2006.01)
*G06F 21/72* (2013.01)

(52) U.S. Cl.
CPC ............ *H04L 9/3278* (2013.01); *G06F 21/72* (2013.01); *H04L 2209/34* (2013.01)

(58) Field of Classification Search
CPC .... H04L 9/3278; H04L 2209/34; G06F 21/72
USPC ......................................................... 713/193
See application file for complete search history.

(56) References Cited

U.S. PATENT DOCUMENTS

| 8,046,661 B2* | 10/2011 | Lablans | H04L 1/0065 708/530 |
| 8,386,990 B1* | 2/2013 | Trimberger | H01L 23/544 257/798 |
| 9,252,960 B2* | 2/2016 | Schrijen | H04L 9/3278 |
| 2009/0327747 A1 | 12/2009 | Bruekers et al. | |
| 2012/0072737 A1* | 3/2012 | Schrijen | H04L 9/3278 713/189 |
| 2013/0185611 A1 | 7/2013 | Goettfert et al. | |
| 2013/0246881 A1* | 9/2013 | Goettfert | H03M 13/00 714/752 |

(Continued)

FOREIGN PATENT DOCUMENTS

| DE | 102011079259 A1 | 1/2013 |
| DE | 102013013047 A1 | 2/2015 |

*Primary Examiner* — Khalil Naghdali
(74) *Attorney, Agent, or Firm* — Viering, Jentschura & Partner MBB (57) ABSTRACT

A data processing device includes a Physical Unclonable Function value source which is set up to provide a reference Physical Unclonable Function value and a plurality of subsequent Physical Unclonable Function values, the reference Physical Unclonable Function value and each subsequent Physical Unclonable Function value having a multiplicity of binary components, a determination device which is set up to determine a set of components, the value of which is identical in the plurality of subsequent Physical Unclonable Function values, and a Physical Unclonable Function reconstruction device which is set up to reconstruct the reference Physical Unclonable Function value from the subsequent Physical Unclonable Function values assuming that the values of the determined components in the subsequent Physical Unclonable Function value match the values of the determined components in the reference Physical Unclonable Function value.

12 Claims, 6 Drawing Sheets

(56) References Cited

U.S. PATENT DOCUMENTS

| 2015/0046718 | A1  | 2/2015 | Meyer     |           |
|--------------|-----|--------|-----------|-----------|
| 2015/0067012 | A1* | 3/2015 | Goettfert | G06F 17/16 |
|              |     |        |           | 708/520   |
| 2015/0188718 | A1* | 7/2015 | Falk      | G09C 1/00 |
|              |     |        |           | 380/278   |

* cited by examiner

DATA PROCESSING DEVICES AND METHODS FOR RECONSTRUCTING A PUF VALUE

CROSS-REFERENCE TO RELATED APPLICATION

This application claims priority to German Patent Application Serial No. 10 2016 102 590.9, which was filed Feb. 15, 2016, and is incorporated herein by reference in its entirety.

TECHNICAL FIELD

Various embodiments relate generally to data processing devices and methods for reconstructing a PUF value.

BACKGROUND

PUFs (Physical Unclonable Functions) are of interest to security-relevant applications, for example for authentication. Mechanisms for generating PUF values generally provide similar, but not identical, PUF values during a plurality of PUF generation processes, which is typically necessary, however, depending on the application, for example for key generation. Efficient methods which make it possible to correct a PUF value produced during a second PUF generation process in such a manner that it matches the PUF value produced in a first PUF generation process are accordingly desirable.

SUMMARY

A data processing device includes a Physical Unclonable Function value source which is set up to provide a reference Physical Unclonable Function value and a plurality of subsequent Physical Unclonable Function values, the reference Physical Unclonable Function value and each subsequent Physical Unclonable Function value having a multiplicity of binary components, a determination device which is set up to determine a set of components, the value of which is identical in the plurality of subsequent Physical Unclonable Function values, and a Physical Unclonable Function reconstruction device which is set up to reconstruct the reference Physical Unclonable Function value from the subsequent Physical Unclonable Function values assuming that the values of the determined components in the subsequent Physical Unclonable Function value match the values of the determined components in the reference Physical Unclonable Function value.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The following detailed description relates to the accompanying figures which show details and exemplary embodiments. These exemplary embodiments are described in such detail that a person skilled in the art can execute the invention. Other embodiments are also possible and the exemplary embodiments can be changed in a structural, logical and electrical respect without departing from the subject matter of the invention. The various exemplary embodiments do not necessarily exclude one another, but rather various embodiments can be combined with one another, thus producing new embodiments. Within the scope of this description, the terms "linked", "connected" and "coupled" are used to describe both a direct and an indirect link, a direct or indirect connection and direct or indirect coupling.

The abbreviation PUF stands for "physical unclonable function" or physical hash function. The idea here is to digitize physical properties of an object and thus obtain a bit sequence (number) assigned to the object. In this case, it is desirable for the bit sequences of two different physical objects not to be correlated with one another. A simple example for illustration is a sheet of paper. When viewed under a microscope, a special fine structure of the wood chips or pulp parts is seen. The structure can be measured with the aid of a suitable method and the result can be displayed as a bit sequence. This bit sequence is the PUF or PUF value for the sheet. In this procedure, a different sheet of paper generally results in a bit sequence which is not correlated with the bit sequence of the first sheet.

The process of producing a bit sequence (the PUF value) from the properties of the physical object is referred to as PUF generation. It is desirable for the PUF generation to be efficiently possible.

A desirable property of a PUF generation mechanism is that the same physical object produces the same bit sequence each time during each PUF generation (for example for each PUF request). However, this is typically not the case. Repeated PUF generation for the same physical object typically provides bit sequences which, although very similar to one another, are generally not identical to one another. This deficit can be compensated for using coding theory methods (error correction).

P is an original PUF value assigned to a physical object. The PUF value is determined once and for all during the production process for the physical object. P is called the true PUF value below and is assigned to the object. The true PUF value P is determined, for example, in the factory in which the physical object is produced, for example as a component of a chip card, by measuring particular sensitive parameters. The values of the measured parameters depend on random structural properties of the object which are outside the control of the manufacturer. Different PUF values which are not correlated with one another generally correspond to different objects.

The PUF value P is a sequence of zeros and ones and can therefore be represented as a binary vector.

The PUF value P can be conceived of as being a type of fingerprint of the physical object. The physical object can be uniquely identified by the true PUF value P. The physical object is part of a chip card, for example.

Figure 1:
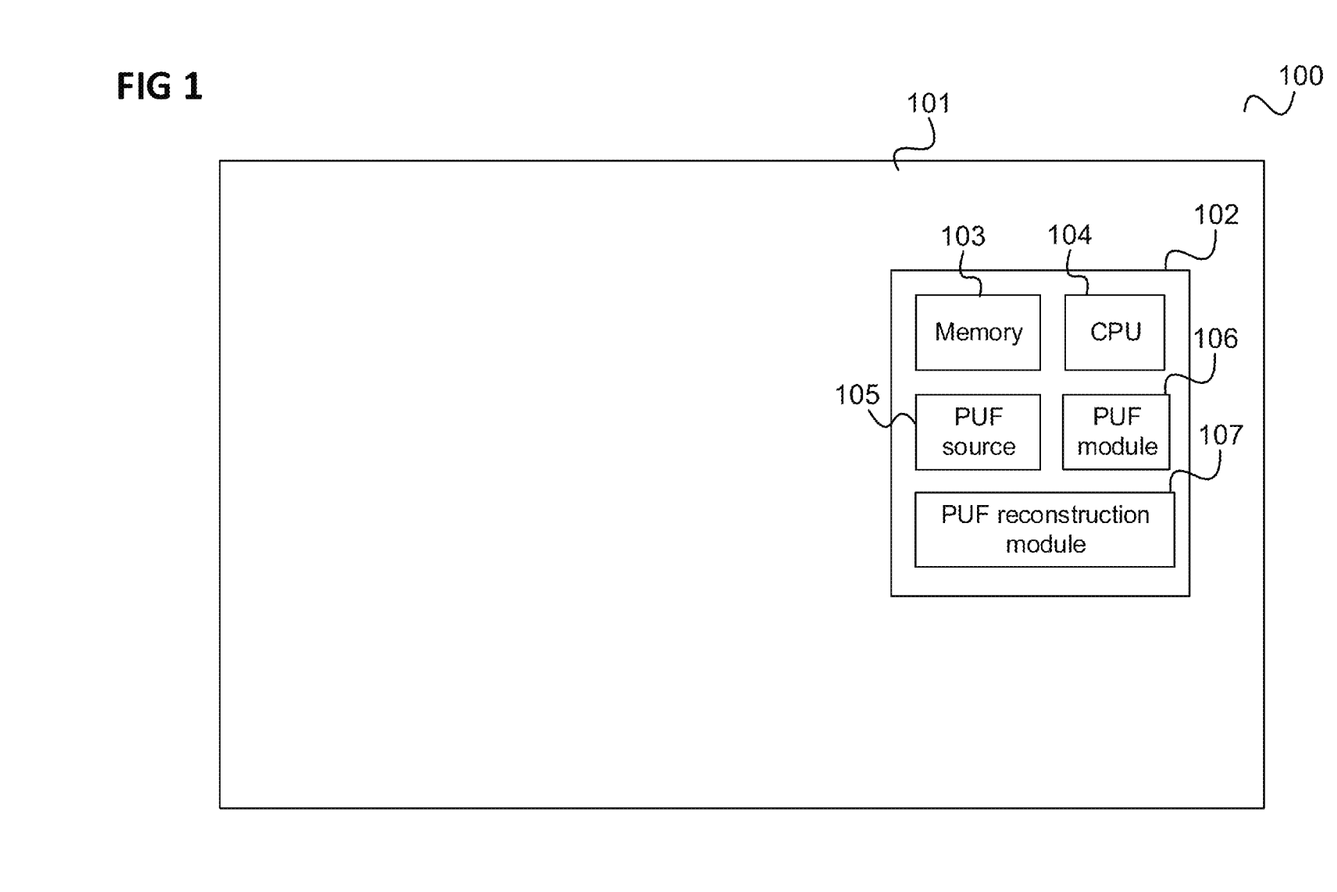
FIG. 1 shows a chip card.

FIG. 1 shows a chip card 100.

The chip card 100 has a carrier and a chip card module 102. The chip card module 102 has various components, for example a non-volatile memory 103 and a CPU (Central Processing Unit) 104. By way of a example, the chip card has a component 105 which is used as a PUF source, for example a memory (for example having a multiplicity of SRAM cells), the random initial state of which is used as the PUF value.

The PUF value P can be considered to be an identification number for the chip card 100 (more specifically for the chip card module 102 in the chip card 100). For example, the chip card module 102 has a cryptoprocessor which derives a chip-card-specific cryptographic key from this identification number or the CPU 104 itself derives a cryptographic key therefrom.

For security reasons, neither the true PUF value P nor the cryptographic key derived from the latter is stored on the chip card 100. Instead, the chip card 100 contains a so-called PUF module 106 which is connected to the physical object 105. If the PUF value P is required, a so-called PUF request is made, whereupon the PUF module 106 newly determines the PUF value each time (by means of internal measurement). In other words, the PUF module 106 responds to a PUF request with the output of a PUF value P'. P' is referred to below as the current PUF value.

On account of environmental influences, aging processes and measurement errors, the current PUF value P' will not necessarily be identical to the true PUF value P. In some components, P and P' will typically differ. However, the aim in any case is to determine the true PUF value P from the current, available PUF value P'. This is referred to as PUF value reconstruction and is carried out, for example, by a PUF value reconstruction module 107 which can also be at least partially implemented by the CPU 104.

For this purpose, an auxiliary variable H is calculated for the true PUF value P determined in this case, for example as early as during production. The auxiliary variable H is likewise a 0-1 sequence (that is to say a binary vector). In terms of information theory, H contains a part of P, but not all of P. It is therefore impossible to determine P from H alone. The auxiliary variable H is stored in the non-volatile memory 103 of the chip card 100. If the current PUF value P' and H are brought together, the true PUF value P can be calculated from these two variables (provided that P' does not differ too much from P).

The PUF value reconstruction—that is to say the determination of P from P' and H—can be carried out with the aid of error-correcting codes. Assuming that the PUF value P has a length of n bits, a binary code C of the length n can be used. In this case, C is a set of code words and each code word of C is a row vector having a length of n bits.

The auxiliary variable H is formed as follows.

P is the true PUF value. The associated auxiliary variable H is then given by $H = P + c,$ where $c = c_{rand}$ is a random code word pulled from C. (The "+" stands for bit-by-bit modulo 2 addition).

The auxiliary variable H, the true PUF value P and the randomly selected code word c are binary row vectors of the same length. H is also referred to as an auxiliary vector below.

A PUF value reconstruction can then be carried out as follows.

The current PUF value P' and the auxiliary vector H are given. The binary vectors P' and H are added component by component. This produces $P' + H = P' + (P + c) = (P' + P) + c = e + c = y.$ That is to say, the sum $y = P' + H$ can be interpreted as a (potentially) erroneous code word.

The vector c is the error-free code word. The vector $e = P' + P$ is the error vector.

The vector y is actually available since y is the vector sum of the current (available) PUF value P' and the auxiliary vector H held in the memory 103. The code word c or, what is equivalent to the latter, the error vector e is calculated from y with the aid of a decoder (for example the PUF value reconstruction module 107).

The true PUF value P can then be calculated from the code word c and the auxiliary vector H: from $H = P + c$, it immediately follows that $P = H + c.$ The reconstruction of the true PUF value P is therefore concluded.

However, this approach functions only when not too many errors have occurred, that is to say when the error vector e does not contain too many ones or—which is synonymous with this—when the true PUF value P and the current PUF value P' do not differ too greatly from one another.

Exemplary embodiments which enable a PUF reconstruction even in the case of a larger number of errors (than can be corrected by the code used) are described below.

In coding theory, it is generally assumed that transmission errors in the individual components occur independently of one another and occur everywhere with the same probability. (The model used is then typically that of a so-called "binary symmetrical channel".) Applied to the PUF reconstruction, this means that each component of P' differs from the corresponding component of P with exactly the same probability. If, on average, the current PUF value P' and the true PUF value P differ in 10% of the components, for example, for a PUF, it would be assumed that any envisaged component is erroneous with the probability of p=0.1 during each new PUF generation.

However, this does not apply to numerous PUFs. The individual components have different error rates. In this case, it should be noted that components with high error rates can be identified and rejected already during production, for example in the factory, and these components are not used. They can therefore be declared to be invalid and ignored. For a PUF with an average of 10% errors, it is therefore entirely possible for a component of P' to differ from the corresponding component in P with the probability of p=0.05 and for another component to differ from the corresponding component in P with the probability of p=0.15.

There may even be component positions at which an error almost never occurs. Such PUF components are referred to as quasi-stable.

According to various embodiments, a) the positions of quasi-stable PUF components are determined, and b) this information is rendered usable for the PUF value reconstruction.

Even if only relatively few of the PUF components are quasi-stable, this fact can be used for the PUF value reconstruction and considerably more errors can be corrected in this manner than would be possible using a decoder (which operates within the scope of the errors which can be corrected according to the code used).

For the purpose of illustration, a PUF of the length n=32 is considered as an example. The error-correcting code used is the (32, 6, 16) Reed-Muller code. In this code, the code words have a length of 32. There are $2^6$=64 different code words. The code has the minimum distance d=16. This means that two different code words differ in at least 16 of their components. This results in an error correction capacity of up to 7 bit errors (for each 32-bit word).

If this code is used for the PUF value reconstruction using a decoder, the PUF value reconstruction will then (and only then) succeed when the current PUF value P' (having a length of 32 bits) differs from the true PUF value P (likewise having a length of 32 bits) in at most 7 components.

It is now assumed that there are six suitable quasi-stable PUF components in P and their positions have been identified. In this case, "suitable" means that the six associated column vectors of the generator matrix of the code are linearly independent.

The corresponding six components can then be taken from the current PUF value P' and are simultaneously six components of the true PUF value P sought. Six components of the true PUF value P having a length of 32 bits are therefore known.

The remaining 26 components of P can be calculated with the aid of these six known components of P and the available auxiliary vector H. That is to say, even when the current PUF value P' differs from the true PUF value P in j components, where j may be any desired number between 0 and 26, the proper reconstruction of the true PUF value P is successful. In various embodiments, up to 26 bit errors, instead of only seven bit errors, can be corrected in this manner (in the PUF segment having a length of 32 bits).

A so-called cumulative error register can be used to determine quasi-stable components and is described in more detail below.

As described above, a) the current PUF value P' and b) the auxiliary vector H are given for the PUF value reconstruction and the true PUF value P is sought.

The following applies to the auxiliary vector H:

$$H=P+c,$$

where c is a randomly selected code word. Addition of P' on both sides of the equation results in $$P'+H=(P'+P)+c.$$

The vector e=P'+P is called an error vector, a designation which applies in a double sense:

On the one hand, the vector e describes the difference between the true PUF value P and the current PUF value P', that is to say, as it were, the error which occurred during the current PUF value generation.

On the other hand, y=P'+H=e+c and the vector y can therefore be interpreted as an erroneous version of the code word c. The situation is similar to the transmission of a message via a channel which is susceptible to interference:

the code word c is transmitted. The transmission error e occurs in the channel and the message word y is received.

During the PUF reconstruction, the vector y=P'+H is available since the vectors P' and H are known.

In order to now calculate the vectors e or c, the vector y can be supplied to a decoder (according to the code used). If not too many bit errors have occurred, the decoder produces either the code word c directly or the error vector e as the output, which depends on the type of decoder used.

Assuming the decoder provides c, the true PUF value P can be calculated by means of P=H+c. The error vector e can be calculated by means of e=P'+P.

Assuming the decoder provides e, the true PUF value P can be calculated by means of P=P'+e. If the code word c is also of interest, it can be calculated from the equation H=P+c: c=P+H.

$P_0, P_1, P_2, \ldots$ are now the current PUF values output by the PUF module 106 at the times t=0, 1, 2, . . . . The vectors $$y_0=H+P_0, y_1=H+P_1, y_2=H+P_2, \ldots$$

are decoded with the aid of a decoder. $e_0, e_1, e_2, \ldots$ are the error vectors which occur in this case.

The cumulative error register is a register of the length n, that is to say the length of the PUF value P. The register is initialized with only zeros ("all zero").

$R_t$ is the content of the register at the time t. The content of the register at the time t+1 is then given by $$R_{(t+1)}=R_t \text{ OR } e_t,$$

where the link "OR" is the component-by-component logical ORing of two binary vectors, that is to say

0 OR 0=0
0 OR 1=1
1 OR 0=1
1 OR 1=1 that is to say (1,0,0,1) OR (0,0,1,0)=(1,0,1,1), for example.

Example: n=10. The first five error vectors are given by $e_0$=1 0 0 0 0 0 0 0 0 0
$e_1$=0 1 0 0 0 0 0 0 0 0
$e_2$=1 1 0 0 0 1 0 0 0 0
$e_3$=0 1 0 0 0 1 0 0 0 0
$e_4$=1 0 0 1 0 0 0 0 0 0

In this case, the contents of the cumulative error register at the times t=0, 1, 2, 3, 4, 5 are given by R0=0 0 0 0 0 0 0 0 0 0
R1=1 0 0 0 0 0 0 0 0 0=e1
R2=1 1 0 0 0 0 0 0 0 0
R3=1 1 0 0 0 1 0 0 0 0
R4=1 1 0 0 0 1 0 0 0 0
R5=1 1 0 1 0 1 0 0 0 0

The cumulative error register can be implemented, for example, as a component of the PUF reconstruction module 107, for example in hardware.

Figure 2:
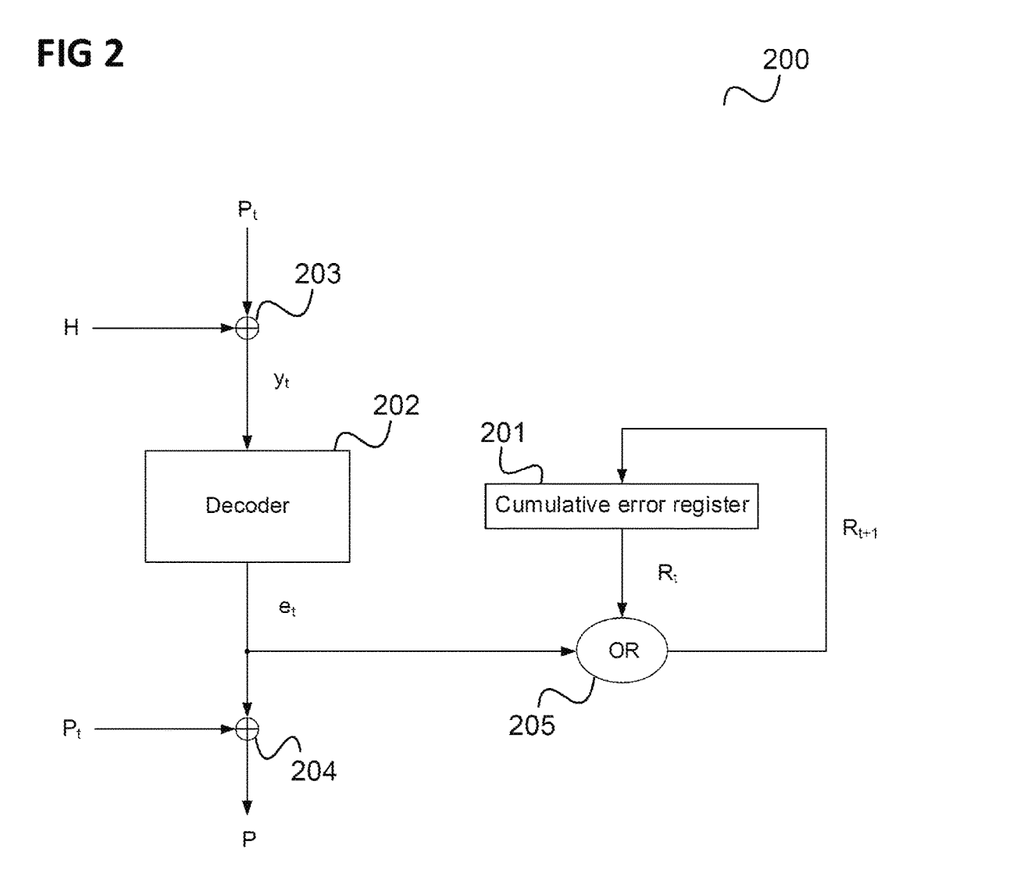
FIG. 2 shows an arrangement having a cumulative error register and a decoder which outputs the error vector as the result.

FIG. 2 shows an arrangement 200 having a cumulative error register 201 and a decoder 202 which outputs the error vector e.

The arrangement 200 is part of the PUF value reconstruction module 107, for example.

A first adder 203 adds the auxiliary data H (which are stored in the memory 103, for example) to the current PUF value $P_t$ and provides the decoder 202 with the result $y_t$. The decoder 202 determines the associated error vector $e_t$ which is added by a second adder 204 to the current PUF value $P_t$, thus reconstructing the true PUF value.

In the text below, adders are understood as meaning units which carry out component-by-component XORing of their input vectors.

In addition, the error vector $e_t$ is supplied to an OR unit 205 which ORs the previous content of the cumulative error register $R_t$ with the error vector $e_t$ in a component-by-component manner and stores the result $R_{t+1}$ in the cumulative error register 201.

Figure 3:
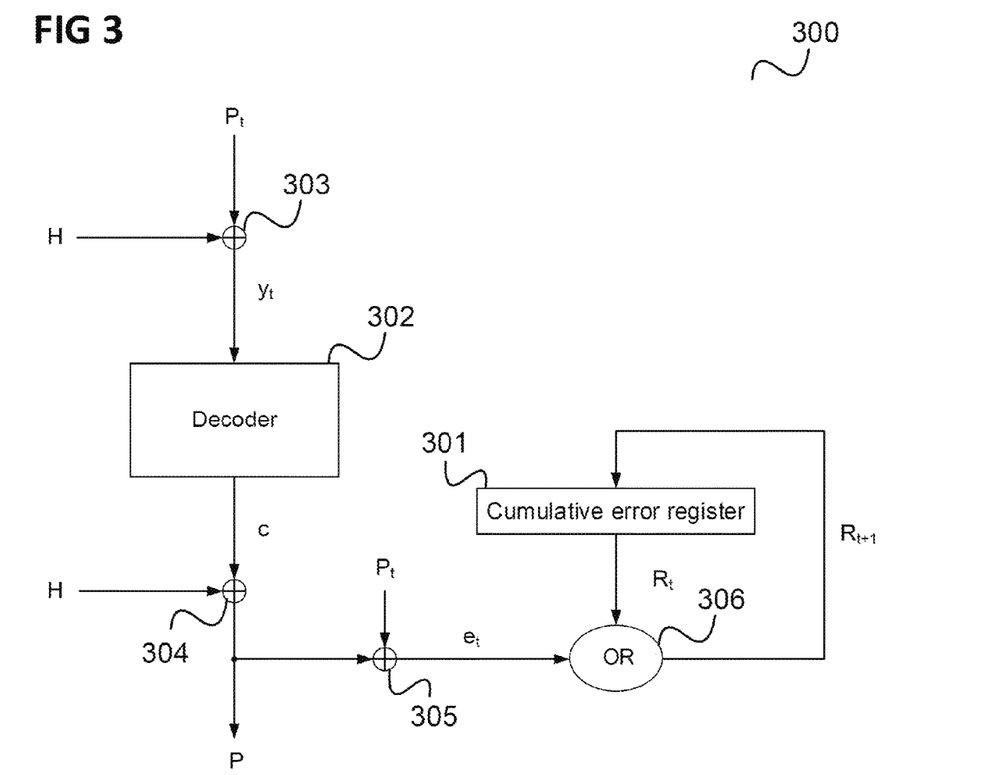
FIG. 3 shows an arrangement having a cumulative error register and a decoder which outputs the code word as the result.

FIG. 3 shows an arrangement 300 having a cumulative error register 301 and a decoder 302 which outputs the code word c.

The arrangement 300 is part of the PUF value reconstruction module 107, for example.

A first adder 303 adds the auxiliary data H (which are stored in the memory 103, for example) to the current PUF value $P_t$ and provides the decoder 302 with the result $y_t$. The decoder 302 determines the associated code word c which is added by a second adder 304 to the auxiliary data H, thus reconstructing the true PUF value.

A third adder 305 adds the reconstructed PUF value to the current PUF value $P_t$, thus producing the associated error vector $e_t$.

The error vector $e_t$ is supplied to an OR unit 306 which ORs the previous content of the cumulative error register $R_t$ with the error vector $e_t$ in a component-by-component manner and stores the result $R_{t+1}$ in the cumulative error register 301.

For a specific cell of the cumulative error register at the time t=N, it means that, if it contains the value 1, an error occurred at least once (and up to N times) in the corresponding PUF component in the course of the first N PUF value generation processes. If the cell contains the value 0, it means that an error did not previously occur in the corresponding PUF component.

Example: in a PUF of the length n=32, the component numbers 5, 9, 17 and 26 are quasi-stable. With each new PUF value generation, these components are erroneous with the probability of p=0.0001. The error probabilities for all other components are between p=0.01 and p=0.15. A PUF value is now generated N times. An error vector e arises during each (successful) PUF value reconstruction and is included in the cumulative error register. For N=1000, the cumulative error register will then have a zero in cells 5, 9, 17 and 26 with a high degree of probability and will have a one in the remaining 28 cells. Therefore, the positions of the four quasi-stable PUF components can be read from the cumulative error register at the time t=1000.

The calculation of a code word from some of its components is now explained below.

A binary (n, M, d) code C is considered. The code has the length n, which means that each code word is a binary vector having n components. The set C contains a total of M code words. The code has the minimum distance d. This means that two different code words differ from one another in at least d components. A code of the minimum distance d can be used to correct all q bit errors, for $1<=q<d/2$.

The components of a code word are redundant. This opens up the possibility of error correction.

The typical situation in coding theory is as follows: a code word $c=(c_1, c_2, \ldots, c_n)$ is transmitted and a message vector $y=(y_1, y_2, \ldots, y_n)$ is received. On account of transmission errors, the components $y_i$ and $c_i$ may differ from one another for certain positions i. Each component of y is assumed to be potentially erroneous. The positions of the actually erroneous components are determined with the aid of a decoder. This is successful if the total number of said components is less than d/2. If the positions of the erroneous components are known, these components are replaced with their binary complement and the code word c is therefore obtained from y.

If it is known that an error has certainly not occurred in particular components of the received message vector y—these components $y_j$ therefore match the code word components $c_j$—the redundancy of the code word components enables second, completely different access to the reconstruction of the transmitted code word c from y, which is described below.

Definition

C is a binary code of the length n. $J=\{j_1, \ldots, j_r\}$ is an index set. That is to say, the set J is a subset of the set $\{1, \ldots, n\}$. The index set J is called code-word-determining if there is at most one code word $c=(c_1, \ldots, c_n)$ in C, with $c_{(j1)}=b_1, \ldots, c_{(jr)}=b_r$, for each binary vector $b=(b_1, \ldots, b_r)$.

The question arises of how many components of a code word must be known in order to be able to calculate the entire code word from said components. The following sentences provide information on this.

Sentence 1:

C is a binary (n, M, d) code. Each index set $J=\{j_1, \ldots, j_r\}$ with $$r < \log M$$

is not code-word-determining, where log(.) denotes the base-2 logarithm.

That is to say, fewer than log M components of a code word do not suffice to clearly reconstruct the code word.

Sentence 2:

C is a binary (n, M, d) code. Each index set $J=\{j_1, \ldots, j_r\}$ with $$r >= n-d+1$$

is code-word-determining.

That is to say, n−d+1 components in any case suffice to calculate the code word.

Sentence 3:

C is a binary (n, M, d) code and $J=\{j_1, \ldots, j_r\}$ is code-word-determining and each true subset of J is not code-word-determining. The following then applies $$\log M <= r <= n-d+1.$$

EXAMPLE

For a binary (32, 64, 16) code (linear or non-linear), n−d+1=17 and log M=6. Any 17 components of the code word having a length of 32 bits clearly determine the code word. However, even 6 components sometimes also suffice.

A binary (n, M, d) code C is called linear if C is a vector space above the base body $F_2=\{0, 1\}$. The dimension of the linear code C is the dimension of the vector space C. A linear code of the dimension k therefore contains $2^k$ code words. That is to say: $M=2^k$.

For a linear code of the length n, the dimension k and the minimum distance d, the designation "(n, k, d) code" is conventional (instead of the more general designation "(n, $2^k$, d) code").

A binary linear (n, k, d) code is clearly defined by a binary k×n matrix G of the rank k, the so-called generator matrix.

In the case of a linear (n, k, d) code, a message vector v having a length of k bits is extended to form a code word c having a length of n bits. It is stated "v is coded into c". The coding is effected by means of the generator matrix:

$$vG=c.$$

The $2^k$ possible message vectors v and the $2^k$ code words of the code are in bijective correspondence to one another: any desired message vector v having a length of k bits clearly determines the associated code word having a length of n bits and, conversely, a clearly determined message vector v having a length of k bits belongs to each code word having a length of n bits.

Sentence 4:

C is a linear (n, k, d) code with the generator matrix $$G=(G_1, \ldots, G_n)$$

and $J=\{j_1, \ldots, j_r\}$ is a subset of $\{1, \ldots, n\}$. The index set J is code-word-determining precisely when k linearly independent vectors are situated among the r column vectors $G_{(j1)}, \ldots, G_{(jr)}$ of the generator matrix.

An algorithm for reconstructing a code word from known code word components is described below, that is to say a rule for how the code word c can be calculated from a code-word-determining index set J and the associated support vector b.

$J=\{j_1, \ldots, j_r\}$ is the code-word-determining index set and $b=(b_1, \ldots, b_r)$ is the associated support vector. That is to say, the following applies to the code word $c=(c_1, \ldots, c_n)$ to be determined $$c_{(j1)}=b_1, \ldots, c_{(jr)}=b_r.$$

$G=(G_1, \ldots, G_n)$ is the generator matrix of the underlying linear (n, k, d) code. According to sentence 4, there are k linearly independent vectors among the r column vectors $$G_{(j1)}, \ldots, G_{(jr)}.$$

k such linearly independent vectors are selected (if there are a plurality of possibilities for doing this, one of these possibilities is chosen).

The selected k linearly independent vectors are denoted using $L_1, \ldots, L_k$. That is to say, $\{L_1, \ldots, L_k\}$ is a linearly independent subset of $\{G_{(j1)}, \ldots, G_{(jr)}\}$.

Since the vectors $L_1, \ldots, L_k$ are linearly independent, the k×k matrix $$M=(L_1, \ldots, L_k)$$

can be inverted. $M^{-1}$ is the inverse matrix to M. That is to say, $MM^{-1}=I$, where I is the k×k unit matrix.

A vector having a length of k bits $b'=(b_1', \ldots, b_k')$ is extracted from the support vector having a length of r bits $b=(b_1, \ldots, b_r)$.

The vector b' is a partial vector of the vector b. The vector b' is produced from the vector b by deleting r-k components from b. The component $b_1$ is removed from the vector b precisely when the column vector $G_{(ji)}$ is not included in the set $\{L_1, \ldots, L_k\}$. In this case, it should be noted that b' is a partial vector of b, and b is a partial vector of $c=(c_1, \ldots, c_n)$.

After constructing b' and the matrix M: $c_j$ is a component of b' precisely when $G_j$ is a column in the matrix M. The following applies $$vG=c$$

to a clearly determined message vector v of the length k. It follows from this equation that $$vM=b'.$$

Multiplying both sides of the equation from the right by the inverse matrix $M^{-1}$ produces $$v=b'M^{-1}.$$

Multiplying both sides of this equation from the right by the generator matrix G produces $$c=vG=b'M^{-1}G.$$

In summary, the following applies

Sentence 5 (Algorithm for Code Word Reconstruction):

A linear (n, k, d) code C with the generator matrix $G=(G_1, \ldots, G_n)$ is given.

Input: code-word-determining index set $J=\{j_1, \ldots, j_r\}$, support vector $b=(b_1, \ldots, b_r)$.

Output: code word $c=(c_1, \ldots, c_n)$.

1) Select k linearly independent vectors among the vectors $G_{(j1)}, \ldots, G_{(jr)}$ and use them to form an invertible matrix M (with the result that the selected vectors represent the columns of the matrix M).

2) Calculate the inverse matrix $M^{-1}$.

3) Determine the partial vector b' of b having a length of k bits on the basis of the k linearly independent column vectors of the generator matrix G selected in 1).

4) Calculate $c=b' M^{-1} G$.

$c=(c_1, \ldots, c_n)$ is then the clearly determined code word from the code C with the property $C_{(ji)}=b_i$ for $i=1, \ldots, r$.

The PUF value reconstruction on the basis of quasi-stable PUF components is described below.

A binary linear (n, k, d) code C with the generator matrix $$G=(G_1, \ldots, G_n)$$

is given again.

As above, P denotes the true PUF value and P' denotes the current PUF value.

The index set $J=\{j_1, \ldots, j_r\}$ is taken from the cumulative error register.

On account of the index set J taken from the cumulative error register, it is assumed that the components of the vectors P and P' match one another at the positions $j_1, \ldots, j_r$.

The auxiliary vector H (a vector which, like the vectors P and P', likewise has the length n) is available for the PUF reconstruction (for example from the memory 103). The following applies $$H=P+c,$$

where c is a randomly selected code word (selected from the underlying code C).

The aim is to calculate this unknown code word c. This then immediately results in the true PUF value $P=H+c$.

Adding P' to both sides of the above equation provides $$P'+H=(P'+P)+c.$$

The vector $y=P'+H=(y_1, \ldots, y_n)$ can be calculated since the vectors P' and H are available.

Since the components of the vectors P and P' match at the positions $j_1, \ldots, j_r$, the error vector $e=P'+P$ has a zero at these positions. The following therefore applies $$c_{(j1)}=y_{(j1)}, \ldots, c_{(jr)}=y_{(jr)}.$$

In other words: the vector $b=(y_{(j1)}, \ldots, y_{(jr)})$ is a support vector for the code word c sought.

If the index set J is code-word-determining, sentence 5 can be used to calculate the code word c. The true PUF value P (via $P=H+c$) and the error vector e (via $e=P+P'$) then result from c. The error vector e can be used to update the cumulative error register.

In summary, the following applies:

Sentence 6 (Algorithm for PUF Value Reconstruction):

$J=\{j_1, \ldots, j_r\}$ is a code-word-determining index set.

Input: P', H, J

Output: c, P, e

1) Calculate $y=P'+H=(y_1, \ldots, y_n)$.
2) Calculate the support vector $b=(y_{(j1)}, \ldots y_{(jr)})$.
3) Use the algorithm described in sentence 5 to calculate the clearly determined code word c for the support vector b, that is to say the code word $c=(c_1, \ldots, c_n)$ with $c_{(ji)}=y_{(ji)}$ for $i=1, \ldots, r$.
4) Calculate P=c+H.
5) Calculate e=P'+P.
6) (optional): Update the cumulative error register with e.

If the index set $J=\{j_1, \ldots, j_r\}$ taken from the cumulative error register is not code-word-determining (that is to say there are no k linearly independent vectors among the r column vectors $G_{(j1)}, \ldots, G_{(jr)}$ of the generator matrix G), the index set J can nevertheless be used for the PUF value reconstruction, namely when the number of linearly independent column vectors is only slightly less than k, for example k−1 or k−2 (see example 3 below for PUF reconstruction).

Example 1 for PUF Reconstruction

The PUF has the length n=8.

Current PUF value: P'=0111 0101.

Auxiliary vector: H=1000 1110.

State of the cumulative error register: R=1011 0010.

Therefore, J={2, 5, 6, 8}.

The underlying code is the (8, 4, 4) Reed-Muller code with the generator matrix $$G = \begin{matrix} 1111 & 1111 \\ 0000 & 1111 \\ 0011 & 0011 \\ 0101 & 0101 \end{matrix}$$

The column vectors $$G_2 = \begin{matrix}1\\0\\0\\1\end{matrix} \quad G_5 = \begin{matrix}1\\1\\1\\0\end{matrix} \quad G_6 = \begin{matrix}1\\1\\0\\1\end{matrix} \quad G_{(8)} = \begin{matrix}1\\1\\1\\1\end{matrix}$$

are linearly independent. Since the code has the dimension k=4, the index set J is code-word-determining.

The matrix $$M = \begin{matrix}1111\\0111\\0001\\1011\end{matrix}$$

is invertible. The associated inverse matrix is $$M^{-1} = \begin{matrix}1100\\1001\\1111\\0010\end{matrix}$$

$$y = P' + H = 1111 \ 1011.$$

y=P'+H=11111011.

The second, fifth, sixth and eighth components of y provide the support vector b=1101.

(The vector b already has the correct length k=4, that is to say b'=b.)

Use of Sentence 5 Produces $c=b'M^{-1}G=(1101)M^{-1}G=(0111)G=0110 \ 1001$.

Therefore, P=c+H=1110 0111 and e=P'+P=1001 0010.

In example 1, the true PUF value P could be reconstructed even though three errors occurred in P'. Since the underlying code has the minimum distance d=4, only 1-bit errors can be corrected with the aid of a decoder (which corrects errors according to the code used).

Example 2 for PUF Reconstruction

A PUF of the length n=31 is considered.

The linear code used is the (31, 5, 16) simplex code, the code words of which are the 32 linearly recursive sequences which perform the recursion $s_{(m+5)}=s_{(m+2)}+s_m$ for $m=0,1,\ldots$.

The code has the generator matrix $$G = \begin{matrix} 10000 & 10010 & 11001 & 11110 & 00110 & 11101 & 0 \\ 01000 & 01001 & 01100 & 11111 & 00011 & 01110 & 1 \\ 00100 & 10110 & 01111 & 10001 & 10111 & 01010 & 0 \\ 00010 & 01011 & 00111 & 11000 & 11011 & 10101 & 0 \\ 00001 & 00101 & 10011 & 11100 & 01101 & 11010 & 1 \end{matrix}$$

The current PUF value P', the auxiliary vector H and the current state R of the cumulative error register are given by

P'=00011 11110 01001 01011 01011 01101 1

H=11110 00111 01000 10101 11110 01100 1

R=11111 10110 11111 11101 11101 10101 1

Therefore, J={7, 10, 19, 24, 27, 29}.

The dimension of the code is k=5.

The five column vectors $L_1=G_7$, $L_2=G_{10}$, $L_3=G_{19}$, $L_4=G_{24}$ and $L_5=G_{27}$ are linearly independent. Therefore $$M = \begin{matrix}00111\\11111\\00011\\11010\\01001\end{matrix} \text{ and } M^{-1} = \begin{matrix}00111\\11111\\10100\\11010\\11110\end{matrix}$$

y=P'+H=1 1 1 0 1 1 1 0 0 1 0 0 0 0 1 1 1 1 1 0 1 0 1 0 1 0 0 0 0 1 0

The support vector b is: b=111000

And the reduced support vector b' is: b'=11100

It follows from sentence 5 c=b' M$^{-1}$ G=(01100)G=01100 11111 00011 01110 10100 00100 1

This results in the true PUF value P:
P=H+c=10010 11000 01011 11011 01010 01000 0
The error vector e is:
e=P'+P=10001 00110 00010 10000 00001 00101 1

Example 3 for PUF Reconstruction

PUF length: n=16.
P'=0100 1100 0001 0111
H=1110 0110 0101 0111
The underlying code is the (16, 5, 8) Reed-Muller code with the generator matrix $$G = \begin{matrix} 1111 & 1111 & 1111 & 1111 \\ 0000 & 0000 & 1111 & 1111 \\ 0000 & 1111 & 0000 & 1111 \\ 0011 & 0011 & 0011 & 0011 \\ 0101 & 0101 & 0101 & 0101 \end{matrix}$$

The state of the cumulative error register is R=11011101 11011011.
Therefore: J={3, 7, 11, 14}.
Since the dimension of the code is k=5, but the index set J contains only four elements, sentence 5 cannot be directly used. The four column vectors of the generator matrix G which are associated with J are nevertheless considered, namely the vectors $$G_3 = \begin{matrix}1\\0\\0\\1\\0\end{matrix}, G_7 = \begin{matrix}1\\0\\1\\1\\0\end{matrix}, G_{11} = \begin{matrix}1\\1\\0\\1\\0\end{matrix}, G_{14} = \begin{matrix}1\\1\\1\\0\\1\end{matrix};$$

The four vectors are linearly independent. Therefore, the 5×4 matrix $$G_J = (G_3, G_7, G_{11}, G_{14}) = \begin{matrix}1111\\0011\\0101\\1110\\0001\end{matrix}$$

has the rank of 4.
The vector y is calculated again:

$y=P'+H=1\ 0\ \underline{1}\ 0\ 1\ 0\ \underline{1}\ 0\ 0\ 1\ \underline{0}\ 0\ 0\ \underline{0}\ 0\ 0$ On account of J={3, 7, 11, 14}, the third, seventh, eleventh and fourteenth components of the code word c to be determined are $c_3=y_3=1, c_7=y_7=1, c_{11}=y_{11}=0, c_{14}=y_{14}=0.$ $v=(v1, v2, v3, v4, v5)$ is the message vector associated with c.
From $vG=c$ it follows, in particular, that $vG_J=(c3, c7, c11, c14).$ That is to say:

$$\begin{aligned} v_1 & & & +v_4 & &= 1 \\ v_1 & & +v_3 & +v_4 & &= 1 \\ v_1 & +v_2 & & +v_4 & &= 0 \\ v_1 & +v_2 & +v_3 & & +v_5 &= 0 \end{aligned}$$

This is a system of four linear equations in the five unknowns $v_1, \ldots, v_5$.
Since the coefficient matrix $G_J$ has the rank of 4, there are exactly two solution vectors:

$v_1=0\ 1\ 0\ 1\ 1$ and $v_2=1\ 1\ 0\ 0\ 0.$

Therefore, there are also two solutions for the code word c sought, namely $c_1=v_1G=0110\ 0110\ 1001\ 1001,$ and $c_2=v_2G=1111\ 1111\ 0000\ 0000.$ Two PUF value candidates correspond to the two code word candidates:

$P_1=c_1+H=1000\ 0000\ 1100\ 1110,$ and $P_2=c_2+H=0001\ 1001\ 0101\ 0111.$

The two associated error vectors are:

$e_1=P_1+P'=1100\ 1100\ 1101\ 1001,$ and $e_2=P_2+P'=0101\ 0101\ 0100\ 0000.$

Since $e_1$ contains nine ones, but $e_2$ contains only five ones, the PUF value $P_2$ is a better approximation to the current PUF value P'. $P_2$ is therefore selected as the more probable candidate for the true PUF value P, that is to say $P=P_2$.

The cumulative error register is not used from the start, but rather is used only after a particular number of PUF value production processes. This is explained below.

As above, P is the true PUF value which has been stipulated (for example in the factory). $P_0, P_1, P_2, \ldots$ are the first, second, third, . . . generated current PUF values. The vectors $y_0=H+P_0$, $y_1=H+P_1$, $y_2=H+P_2, \ldots$ are calculated using the auxiliary vector H. The vectors $y_0, y_1, y_2, \ldots$ are input to the decoder which then calculates the associated error vectors $e_0, e_1, e_2, \ldots$. The states $R_1, R_2, R_3, \ldots$ of the cumulative error register result from the error vectors and the initialization vector $R_0$.

Assuming that the value 0 is in a particular cell of the cumulative error register at the time t=3. It then cannot be assumed that the corresponding PUF component is quasi-stable. However, this assumption would be applied, for instance, if a 0 were there at the time t=3000 (for example), which means that an error never occurred in this component over the course of the first 3000 PUF value generation processes.

The period of time during which the cumulative error register cannot yet be used is referred to as the set-up phase.

The question arises of how long the set-up phase lasts. In other words, it is of interest to know how often (at least) the cumulative error register has to be updated with an error vector provided by the decoder before it can be used (that is to say until it provides reliable statements regarding the quasi-stable components).

The time from which the cumulative error register is ready for use is determined, for example, by calculating the time from which the probability for an error in the code word reconstruction (on the basis of the information in the cumulative error register) is lower than the probability for a decoder error.

The following results:

For a PUF of the length n with an average error rate p and the use of a linear (n, k, d) code, the cumulative error register can be used as a time t when $$t > 1/(1 - B^{1/k}) \text{ with } B = \sum_{j=0}^{b} \binom{n}{j} p^j (1-p)^{n-j}$$

where b is the largest integer with b<d/2.

Example

PUF length is n=16.
Average error rate is 10%, that is to say p=0.1.
The underlying code is the (16, 5, 8) Reed-Muller code.

$B=(1-p)^{16}+16p(1-p)^{15}+120p^2(1-p)^{14}+560p^3(1-p)^{13}$
and $1/(1-B^{1/5})=71.064$.

Therefore, according to one embodiment, the cumulative error register is updated 72 times before it is used.

Figure 4:
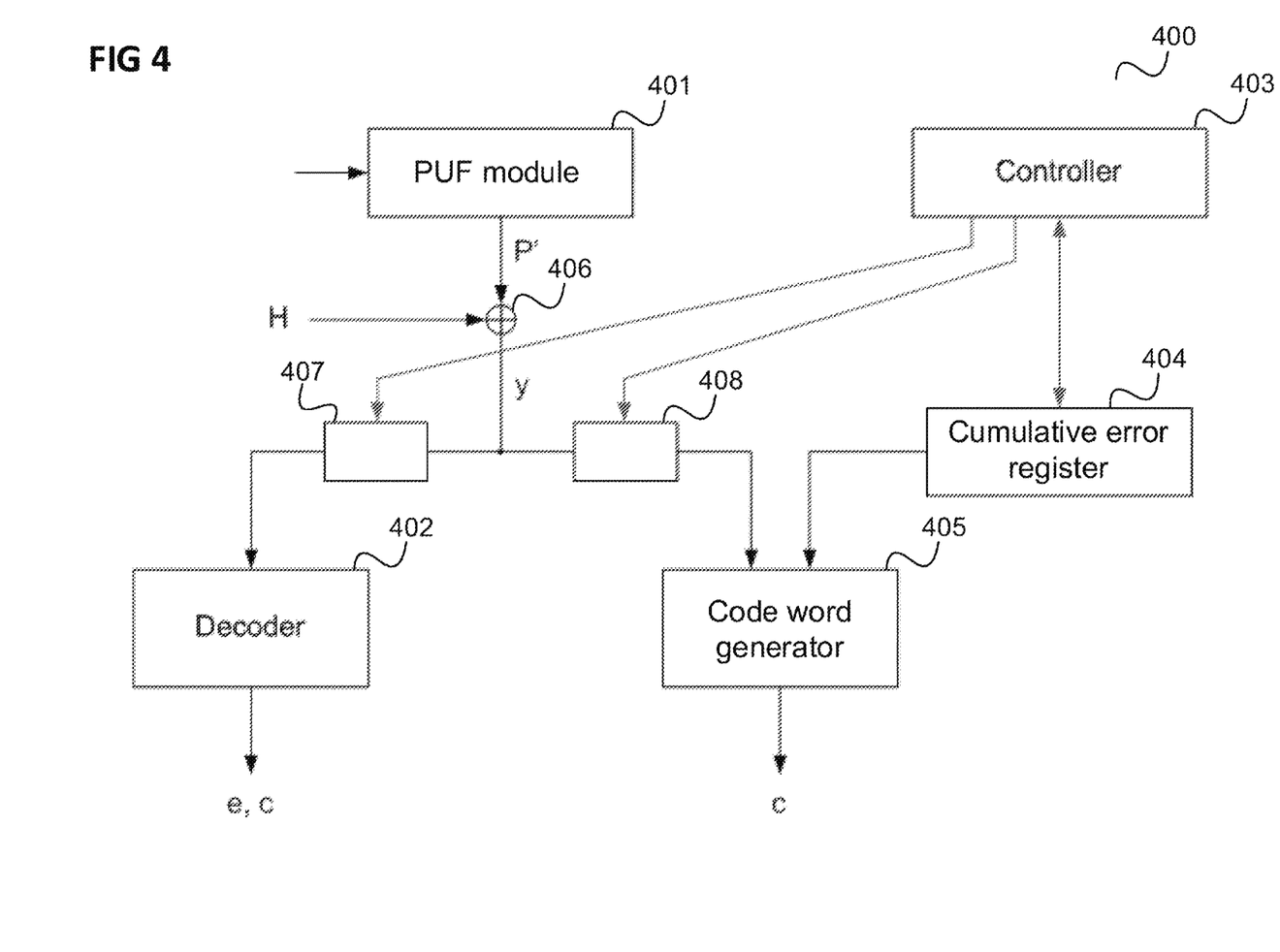
FIG. 4 shows an arrangement which enables different operating modes for the PUF reconstruction.

FIG. 4 shows an arrangement 400 which enables different operating modes for the PUF reconstruction, e.g. a PUF reconstruction according to sentence 6.

The arrangement has a PUF module 401, a decoder 402, a control device 403, a cumulative error register 404 and a code word generator 405.

The arrangement 400 is part of the PUF value reconstruction module 107, for example.

A first adder 406 adds the auxiliary data H (which are stored in the memory 103, for example) to the current PUF value $P_t$ provided by the PUF module 401.

The result $y_t$ is supplied to the decoder 402 via a first latch 407 if it is open. The decoder 402 determines the associated error vector $e_t$ or the associated code word C if it is not overexerted because too many errors have occurred. As described above, the true PUF value is reconstructed from $e_t$ and c.

In addition, the result $y_t$ is supplied to the code word generator 405 via a second latch 408 if it is open, which code word generator carries out a PUF reconstruction according to sentence 6 using the information relating to quasi-stable components obtained from the cumulative error register 404 which is filled, for example, in the manner described with reference to FIG. 2 or FIG. 3.

The control device 403 can read the level of the cumulative error register. The control device 403 can also reset the cumulative error register to the initial state of "all zero". The control device 403 opens and closes the latches 407, 408 according to one of the following operating modes, for example:

1) Decoder preferred: latch 407 open, latch 408 closed.

If the decoder 402 could perform its task because not too many errors occurred, the code word generator 405 is not used. The code word generator 405 is used only if the decoder 402 cannot manage the correction and communicates this information to the control device 403.

2) Code word generator preferred: latch 407 closed, latch 408 open.

The decoder 402 is used only during the set-up phase to set up the cumulative error register. The code word c (from which the true PUF value P then immediately results) is then always calculated using the code word generator 405.

3) Double calculation: both latches 407, 408 open.

The code word c (and therefore the true PUF value P) is calculated in two ways: using the decoder 405 and using the code word generator 408.

Figure 5:
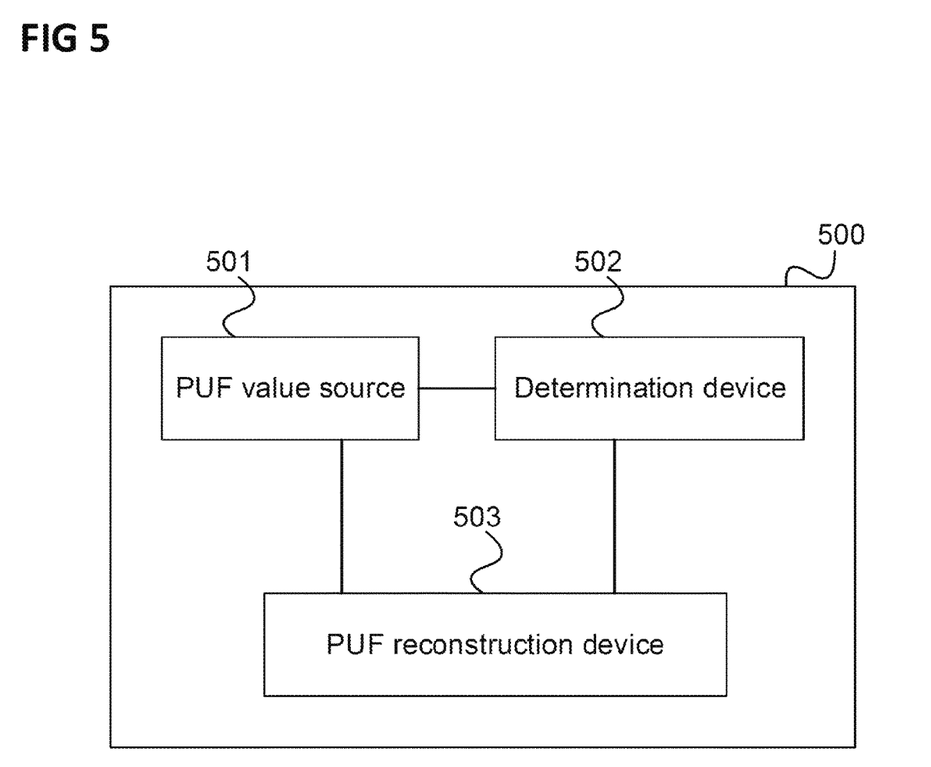
FIG. 5 shows a data processing device according to one embodiment.

In summary, various embodiments provide a data processing device, as illustrated in FIG. 5.

FIG. 5 shows a data processing device 500.

The data processing device 500 has a PUF value source 501 which is set up to provide a reference PUF value and a plurality of subsequent PUF values, the reference PUF value and each subsequent PUF value having a multiplicity of binary components.

The data processing device 500 also has a determination device 502 which is set up to determine a set of components, the value of which is identical in the plurality of subsequent PUF values.

Furthermore, the data processing device has a PUF reconstruction device 503 which is set up to reconstruct the reference PUF value from the subsequent PUF values assuming that the values of the determined components in the subsequent PUF value match the values of the determined components in the reference PUF value.

In other words, various exemplary embodiments provide a device for determining the positions of quasi-stable PUF components and, if in existence, the values of the quasi-stable components of the current PUF value are used for the PUF reconstruction (for example with the existence and knowledge of a sufficiently large number of suitable quasi-stable PUF component positions). The PUF reconstruction is carried out, for example, using an algorithm for calculating a code word from particular known components of the code word.

The components of the data processing device (for example the determination device and the PUF reconstruction device) can be implemented by one or more circuits. In one embodiment, a "circuit" can be understood as meaning any unit which implements logic and may be hardware, software, firmware or a combination thereof. In one embodiment, a "circuit" may therefore be a hard-wired logic circuit or a programmable logic circuit, for example a programmable processor. A "circuit" can also be understood as meaning a processor which executes software, for example any type of computer program. In one embodiment, a "circuit" can be understood as meaning any type of implementation of the functions described below.

Figure 6:
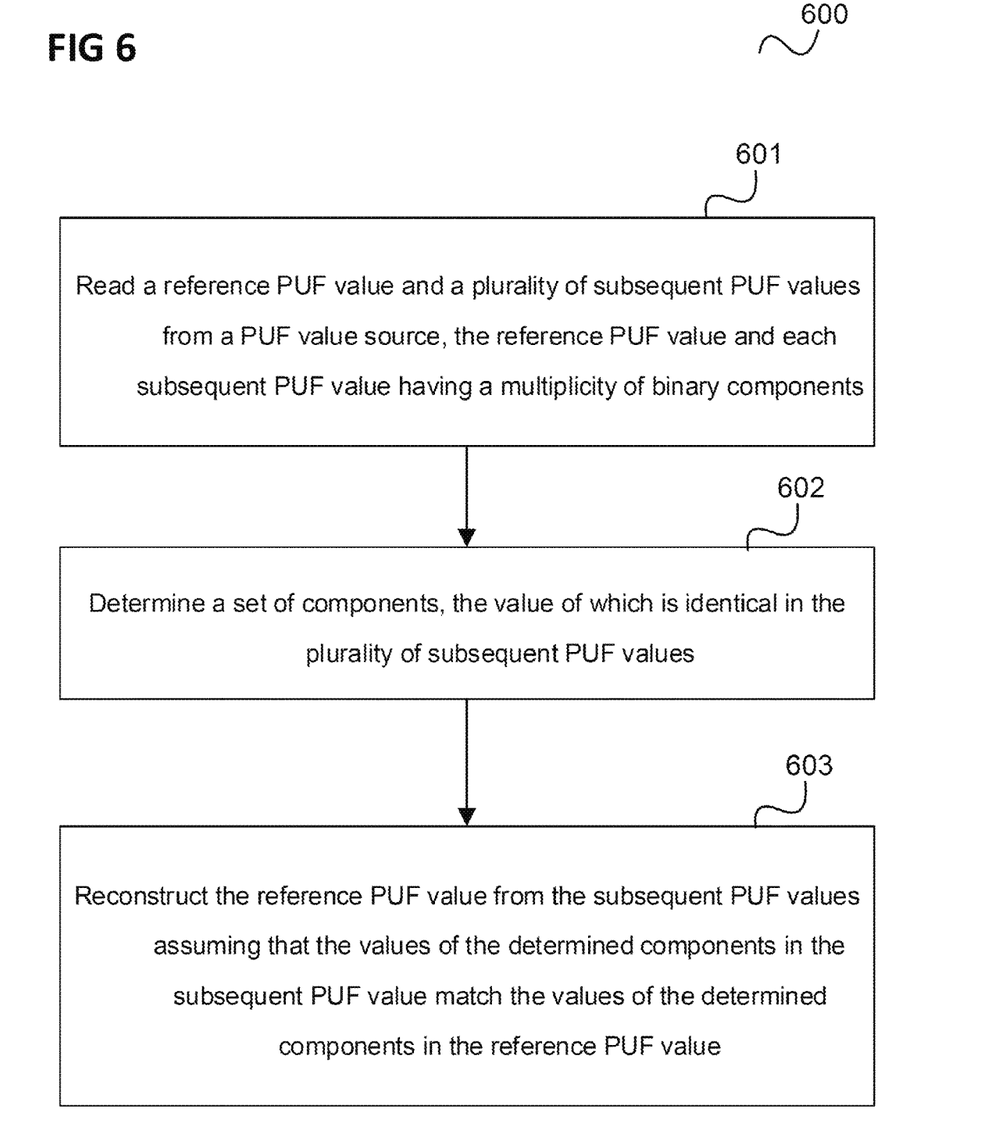
FIG. 6 shows a flowchart illustrating a method for reconstructing a PUF value according to one embodiment.

The data processing device 500 carries out, for example, a method for reconstructing a PUF value, as illustrated in FIG. 6.

FIG. 6 shows a flowchart according to one embodiment.

In 601, a reference PUF value and a plurality of subsequent PUF values are read from a PUF value source, the reference PUF value and each subsequent PUF value having a multiplicity of binary components.

In 602, a set of components, the value of which is identical in the plurality of subsequent PUF values, is determined.

In 603, the reference PUF value is reconstructed from the subsequent PUF values assuming that the values of the determined components in the subsequent PUF value match the values of the determined components in the reference PUF value.

Further embodiments are described below.

Embodiment 1 is a data processing device, as illustrated in FIG. 1.

Embodiment 2 is a data processing device according to embodiment 1, having a memory for storing auxiliary data for reconstructing the reference PUF value, the PUF reconstruction device being set up to reconstruct the reference PUF value on the basis of the auxiliary data.

Embodiment 3 is a data processing device according to embodiment 2, the auxiliary data being based on the reference PUF value and a code word of a code.

Embodiment 4 is a data processing device according to embodiment 3, the auxiliary data being the sum of the reference PUF value and a code word of a code.

Embodiment 5 is a data processing device according to embodiment 3 or 4, the PUF reconstruction device being set up to reconstruct the reference PUF value by determining the code word.

Embodiment 6 is a data processing device according to one of embodiments 3 to 5, the code being a linear code.

Embodiment 7 is a data processing device according to embodiment 6, the PUF reconstruction device being set up to reconstruct the reference PUF value by selecting linearly independent columns of the columns corresponding to the determined components and multiplying the inverse matrix to a matrix formed from the selected columns by the generator matrix of the code.

Embodiment 8 is a data processing device according to one of embodiments 1 to 7, having a PUF module for reading the subsequent PUF values from the PUF source.

Embodiment 9 is a data processing device according to one of embodiments 1 to 8, the PUF source being a physical object.

Embodiment 10 is a data processing device according to one of embodiments 1 to 9, the PUF source being a component of a chip card.

Embodiment 11 is a data processing device according to one of embodiments 1 to 10, the data processing device being a chip card module.

Embodiment 12 is a data processing device according to one of embodiments 1 to 11, the determination device being set up to determine the set of components, the value of which is identical in the plurality of subsequent PUF values, by ORing the error vectors of the subsequent PUF values.

Embodiment 13 is a method for reconstructing a PUF value, as illustrated in FIG. 6.

One embodiment provides a data processing device having a PUF value source which is set up to provide a reference PUF value and a plurality of subsequent PUF values, the reference PUF value and each subsequent PUF value having a multiplicity of binary components, a determination device which is set up to determine a set of components, the value of which is identical in the plurality of subsequent PUF values, and a PUF reconstruction device which is set up to reconstruct the reference PUF value from the subsequent PUF values assuming that the values of the determined components in the subsequent PUF value match the values of the determined components in the reference PUF value.

Another embodiment provides a method for reconstructing a PUF value according to the data processing device described above.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A data processing device, comprising:
a Physical Unclonable Function value source which is set up to provide a reference Physical Unclonable Function value and a plurality of subsequent Physical Unclonable Function values, the reference Physical Unclonable Function value and each subsequent Physical Unclonable Function value having a multiplicity of binary components;
a determination device which is set up to determine a set of corresponding components in each of the plurality of subsequent Physical Unclonable Function values in which values of the corresponding components between the plurality of subsequent Physical Unclonable Function values are identical;
a Physical Unclonable Function reconstruction device which is set up to reconstruct the reference Physical Unclonable Function value from the subsequent Physical Unclonable Function values assuming that the values of the determined components in the subsequent Physical Unclonable Function value match the values of the determined components in the reference Physical Unclonable Function value; and
a memory for storing auxiliary data for reconstructing the reference Physical Unclonable Function value, the Physical Unclonable Function reconstruction device being set up to reconstruct the reference Physical Unclonable Function value on the basis of the auxiliary data.

2. The data processing device of claim 1,
wherein the auxiliary data is based on the reference Physical Unclonable Function value and a code word of a code.

3. The data processing device of claim 1,
wherein the auxiliary data is the sum of the reference Physical Unclonable Function value and a code word of a code.

4. The data processing device of claim 2,
wherein the Physical Unclonable Function reconstruction device is set up to reconstruct the reference Physical Unclonable Function value by determining the code word.

5. The data processing device of claim 2,
wherein the code is a linear code.

6. The data processing device of claim 5,
wherein the Physical Unclonable Function reconstruction device is set up to reconstruct the reference Physical Unclonable Function value by selecting linearly independent columns of the columns corresponding to the determined components and multiplying an inverse matrix to a matrix formed from the selected columns by a generator matrix of the code.

7. The data processing device of claim 1, further comprising:
a Physical Unclonable Function module for reading the subsequent Physical Unclonable Function values from the Physical Unclonable Function source.

8. The data processing device of claim 1,
wherein the Physical Unclonable Function source is a physical object.

9. The data processing device of claim 1,
wherein the Physical Unclonable Function source is a component of a chip card.

10. The data processing device of claim 1, wherein the data processing device is a chip card module.

11. The data processing device of claim 1, wherein the determination device is set up to determine the set of corresponding components in the plurality of subsequent Physical Unclonable Function values, by ORing error vectors of the subsequent Physical Unclonable Function values.

12. A method for reconstructing a Physical Unclonable Function value, the method comprising:

reading a reference Physical Unclonable Function value and a plurality of subsequent Physical Unclonable Function values from a Physical Unclonable Function value source, the reference Physical Unclonable Function value and each subsequent Physical Unclonable Function value having a multiplicity of binary components;

determining a set of corresponding components in each of the plurality of subsequent Physical Unclonable Function values in which values of the corresponding components between the plurality of subsequent Physical Unclonable Function values are identical;

reconstructing the reference Physical Unclonable Function value from the subsequent Physical Unclonable Function values assuming that the values of the determined components in the subsequent Physical Unclonable Function value match the values of the determined components in the reference Physical Unclonable Function value and reconstructing the reference Physical Unclonable Function value based on auxiliary data stored in a memory.

* * * * *